(12) United States Patent
Jang et al.

(10) Patent No.: US 9,021,683 B2
(45) Date of Patent: May 5, 2015

(54) ROTOR HOUSING FOR EASY AND SAFE ASSEMBLING AND METHOD FOR ASSEMBLING MOTOR SET USING THE ROTOR HOUSING

(75) Inventors: Jeong Cheol Jang, Gwangju (KR); Ji Min Lee, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 202 days.

(21) Appl. No.: 13/639,670

(22) PCT Filed: Mar. 8, 2011

(86) PCT No.: PCT/KR2011/001597
§ 371 (c)(1),
(2), (4) Date: Oct. 24, 2012

(87) PCT Pub. No.: WO2011/139018
PCT Pub. Date: Nov. 10, 2011

(65) Prior Publication Data
US 2013/0113335 A1    May 9, 2013

(30) Foreign Application Priority Data

May 4, 2010    (KR) ........................ 10-2010-0041886

(51) Int. Cl.
*H02K 5/00*    (2006.01)
*H02K 15/04*    (2006.01)
*H02K 5/04*    (2006.01)
*H02K 15/02*    (2006.01)
*H02K 1/18*    (2006.01)
*H02K 5/15*    (2006.01)
*H02K 15/14*    (2006.01)

(52) U.S. Cl.
CPC ............. *H02K 5/04* (2013.01); *Y10T 29/49009* (2015.01); *H02K 15/02* (2013.01); *Y10T 29/49012* (2015.01); *H02K 1/187* (2013.01); *H02K 5/15* (2013.01); *H02K 15/028* (2013.01); *H02K 5/00* (2013.01); *H02K 15/14* (2013.01)

(58) Field of Classification Search
CPC ..... H02K 15/02; H02K 15/16; H02K 15/028; H02K 15/14; Y10T 29/49009; Y10T 29/49012
USPC ......................................... 310/261.1; 29/596
See application file for complete search history.

(56) References Cited

U.S. PATENT DOCUMENTS

2003/0189338 A1* 10/2003 Rose, Sr. ........................ 290/1 R
2005/0210604 A1*  9/2005 Schmid et al. .................... 8/158
2007/0152521 A1    7/2007 Park (Continued)

FOREIGN PATENT DOCUMENTS

JP    2001-275284 A    10/2001
JP    2008-516577 A    5/2008

(Continued)

*Primary Examiner* — Michael Andrews
*Assistant Examiner* — Rashad Johnson
(74) *Attorney, Agent, or Firm* — Sherr & Jiang, PLLC

(57) ABSTRACT

The present invention relates to a method for assembling a motor set that includes: coupling a rotor housing having a plurality of operating holes to a stator having shaft bushings with holes formed therein through the operating holes, thereby making the holes to be seen through the operating holes; coupling the holes of the stator associated with the rotor housing to stator assembly holes of a motor set assembly, the holes of the stator being aligned with the stator assembly holes of the motor set assembly; and inserting rivets into the holes through the operating holes and coupling the rivets to the stator assembly holes.

2 Claims, 3 Drawing Sheets

(56) References Cited

U.S. PATENT DOCUMENTS

| | | |
|---|---|---|
| 2007/0163306 A1* | 7/2007 | Kim et al. ............. 68/140 |
| 2009/0108693 A1* | 4/2009 | Jun et al. ............. 310/156.01 |
| 2011/0127861 A1 | 6/2011 | Park |

FOREIGN PATENT DOCUMENTS

| | | |
|---|---|---|
| JP | 2008-228424 A | 9/2008 |
| KR | 10-2004-0010793 A | 1/2004 |
| KR | 10-2004-0036198 A | 4/2004 |
| KR | 10-2005-0122555 A | 12/2005 |
| KR | 10-2005-0122556 A | 12/2005 |
| KR | 10-2005-0122557 A | 12/2005 |
| KR | 10-2005-0122564 A | 12/2005 |
| WO | WO 2006/001652 A1 | 1/2006 |
| WO | WO 2006001652 A1 * | 1/2006 |
| WO | WO2006/080686 | 8/2006 |

* cited by examiner

ROTOR HOUSING FOR EASY AND SAFE ASSEMBLING AND METHOD FOR ASSEMBLING MOTOR SET USING THE ROTOR HOUSING

CROSS REFERENCE TO PRIOR APPLICATIONS

This application is a National Stage Patent Application of PCT International Patent Application No. PCT/KR2011/001597 (filed on Mar. 8, 2011) under 35 U.S.C. §371, which claims priority to Korean Patent Application No. 10-2010-0041886 (filed on May 4, 2010), which are all hereby incorporated by reference in their entirety.

TECHNICAL FIELD

The present invention relates to a motor. More particularly, the present invention relates to a rotor housing structure and a method for assembling a motor set using the rotor housing structure that makes it easier to assemble a rotor and a stator of a motor set for washing machine on a motor set assembly.

BACKGROUND ART

Generally, motors for driving a tub of a drum type washing machine are outer rotor type DD (Direct Driving) motors. The washing machine with a DD motor is assembled in an orderly manner that a stator is coupled to a motor set assembly of a washer main body, and then a rotor to the exterior of the stator. FIG. 1 illustrates the assembly procedure of a conventional motor set.

Referring to FIG. 1, a motor set assembly 100 is shown in step (a). In the center of the motor set assembly 100 is formed a shaft 101 for rotating the rotor, with a plurality of stator assembly holes 105 formed around the shaft 101 for fixing a stator 110 to the motor set assembly 100. In step (b), a plurality of coupling bushings 111 are formed on the inner side of a stator 110, and each of them has a hole 112. The holes 112 are arranged in alignment with the stator assembly holes 105 of the motor set assembly 100 so that they are coupled to the stator assembly holes 105 through a plurality of rivets 115, in step (c). In this way the stator 110 is coupled to the motor set assembly 100. In step (d), a rotor 120 is applied to embrace the stator 110. In the center of the rotor 120 is formed a resin-molded shaft bushing 125, the center of which has a shaft coupling portion 121. In step (e), a rotor fixing bolt 126 is fitted in the shaft coupling portion 121 to complete the assembly of the motor set.

The assembly method of the conventional motor set involves applying the stator 110 to the motor set assembly 100 (in steps (b) and (c)) and then the rotor 120 to the motor set assembly 100 (in step (d)). This causes a strong friction between the rotor 120 and the stator 110 as the rotor 120 is applied to embrace the stator 110, because a plurality of magnets (not shown) coupled to the inner side of the rotor 120 have a strong magnetic attraction towards the outer circumference (i.e., teeth) of the stator 110. The friction leaves cracks on the magnets and ends up a need of replacing the whole rotor 120, resulting in a deterioration of productivity. Moreover, the worker who manually applies the rotor to the stator can be seriously injured with his/her hands accidently stuck between the rotor and stator.

To overcome the above-mentioned problems, the present invention proposes a novel rotor housing structure and a method for assembling a motor set, to improve the operation process.

DISCLOSURE OF INVENTION

Technical Problem

Accordingly, the present invention has been made in view of the above-mentioned problems occurring in the prior art, and it is an object of the present invention to provide a novel rotor housing structure that makes it possible to couple both a rotor and a stator to a motor set assembly at the same time.

It is another object of the present invention to provide a method for assembling a motor set that includes a step of applying both a rotor and a stator to a motor set assembly at the same time, thereby preventing damages on the magnets formed on an inner side of the rotor.

It is further another object of the present invention to provide a method for assembling a motor set that enhances productivity.

It is still further another object of the present invention to provide a method for assembling a motor set that prevents potential accidents of workers.

Solution to Problem

To achieve the above object, according to the present invention, there is provided a method for assembling a motor set that includes: coupling a rotor housing having a plurality of operating holes to a stator having shaft bushings with holes formed therein through the operating holes, thereby making the holes to be seen through the operating holes; coupling the holes of the stator associated with the rotor housing to stator assembly holes of a motor set assembly, the holes of the stator being aligned with the stator assembly holes of the motor set assembly; and inserting rivets into the holes through the operating holes and coupling the rivets to the stator assembly holes.

The method for assembling a motor set according to the present invention further includes: coupling a shaft coupling portion disposed in center of the rotor housing to a shaft of the motor set assembly.

In another aspect of the present invention, there is provided a rotor housing, which has a shaft bushing in the center thereof, the rotor housing including a plurality of operating holes disposed at a defined position between an outer circumference of the rotor housing and the shaft bushing.

In the rotor housing of the present invention, the defined position corresponds to the position of a plurality of holes formed in a stator to be coupled to the rotor housing.

Advantageous Effects of Invention

The present invention introduces a step of applying both a rotor and a stator to a motor set assembly at the same time, to prevent damages on the magnets disposed on an inner side of the rotor, reducing defectiveness of the product and increasing productivity, and to prevent potential accidents of workers.

MODE FOR THE INVENTION

Hereinafter, an explanation on the preferred embodiments of the present invention will be given in detail with reference to the attached drawings.

Figure 2:
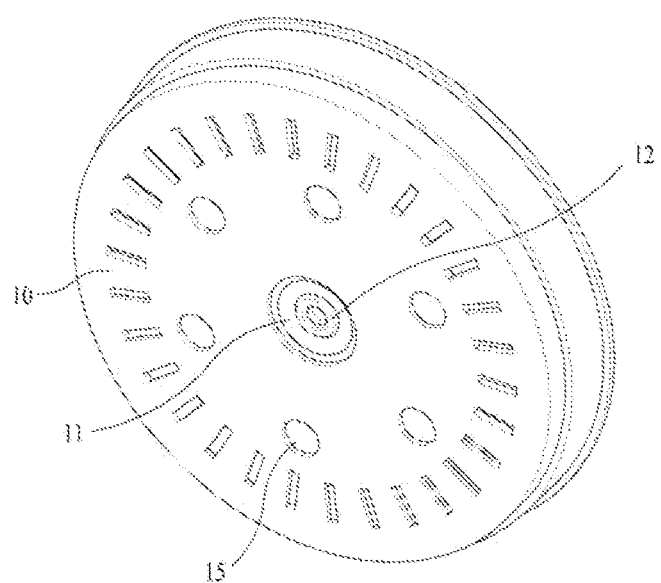
FIG. 2 is a perspective showing a rotor housing according to the present invention.

FIG. 2 is a perspective showing a rotor housing 10 according to the present invention.

In the center of the rotor housing 10 of the present invention is formed a shaft bushing 11, as shown in FIG. 2. The shaft bushing 11 preferably is, but not limited to, a resin-molded portion to be coupled to a shaft of the motor. Otherwise, the shaft bushing 11 may be formed from a separate member other than a resin molding material, or formed in integration with the rotor housing 10 instead of using a separate member, to have a shape suitable for the shaft to be coupled to the center of the rotor housing 10.

The center of the shaft bushing 11 has a shaft coupling portion 12 to be coupled to a shaft 101 of a motor set assembly 100. And a plurality of operating holes 15 are formed between the shaft bushing 11 and the outer circumference of the rotor housing 10. The operating holes 15 are arranged in alignment with coupling bushings 111 of a stator 110. Holes 112 of the coupling bushings 111 on the inner side of the stator 110 can be seen through the operating holes 15 so that rivets 115 are fitted in the holes 112 through the operating holes 15. In other words, the operating holes 15 provide operation spaces for the stator 110 to be coupled to the motor set assembly 100 through the rivets 115. The number of the operating holes is, but not limited to, six in FIG. 2 and may depend on the number of the coupling bushings and the holes formed in the stator.

With a plurality of operating holes 15, the rotor housing 10 facilitates an assembly of the rivets 115 through the operating holes 15, thus improving the motor set assembly process. The improved method for assembling a motor set is described below with reference to FIG. 3.

Figure 3:
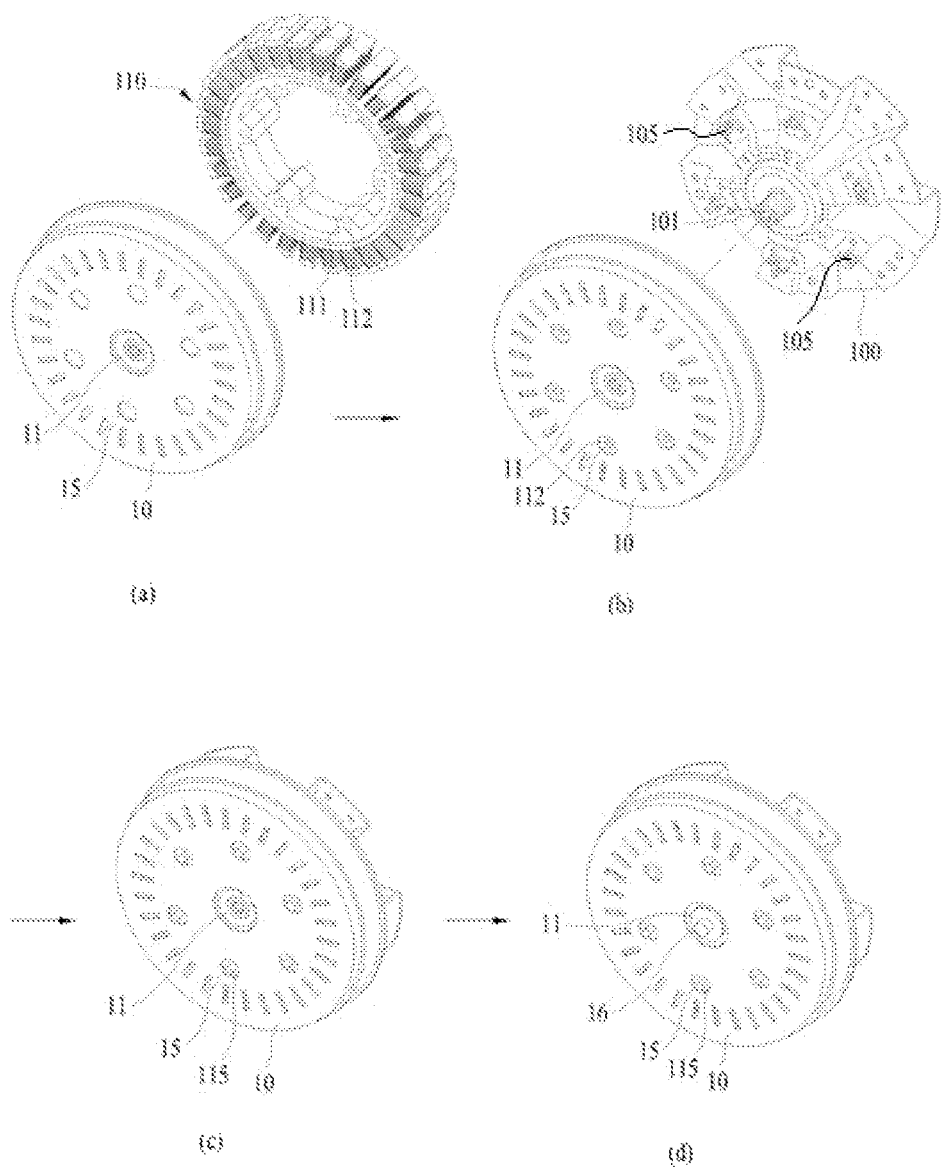
FIG. 3 is a schematic showing a method for assembling a motor set according to the present invention.

FIG. 3 shows the respective steps of the method for assembling a motor set according to the present invention.

Figure 1:
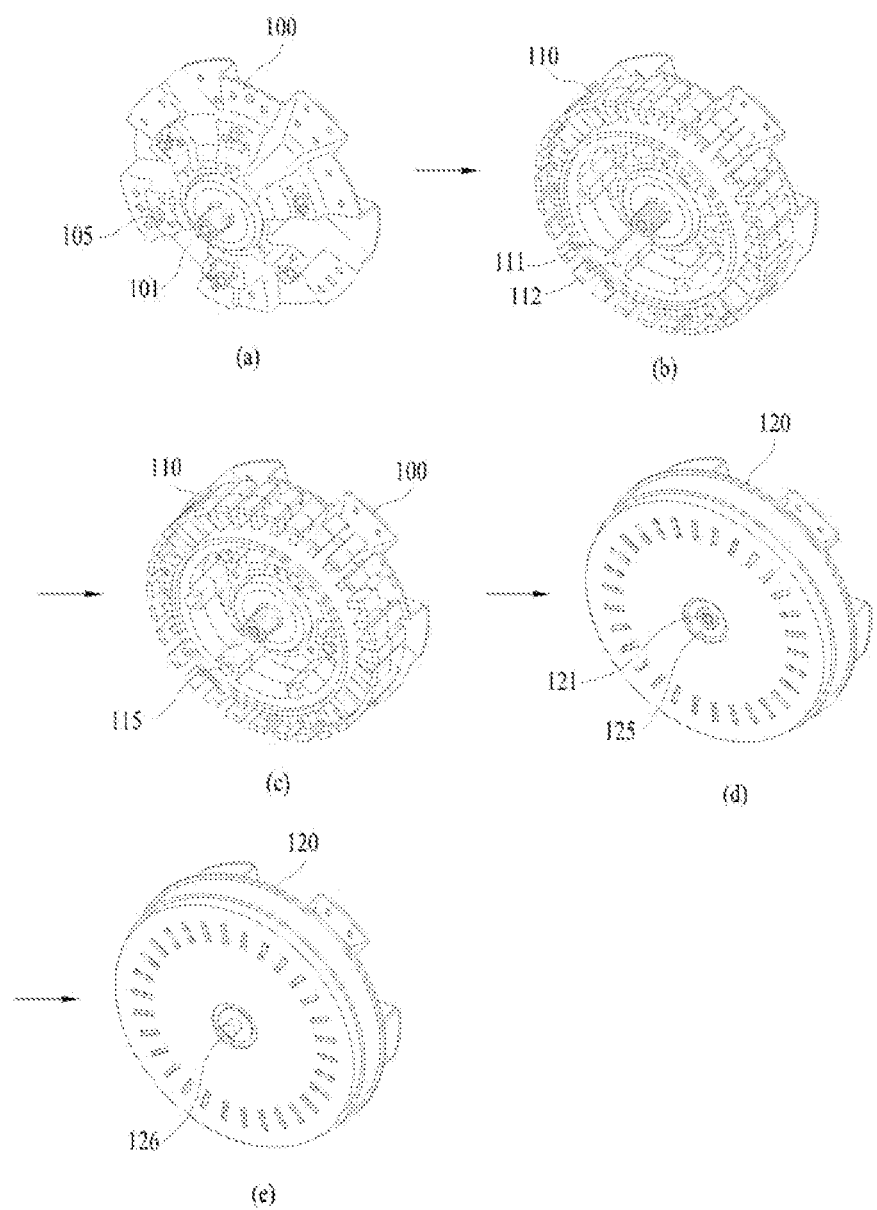
FIG. 1 is a schematic of the assembly procedure according to a conventional method for assembling a motor set.

Referring to FIG. 3, the rotor housing 10 is coupled to the stator 110, in step (a), where the operating holes 15 of the rotor housing 10 are aligned with the holes 112 of the coupling bushings 111. In other words, the rotor housing 10 is coupled to the stator 110 to make the holes 112 to be seen through the operating holes 15. This step (a) is the obvious feature that makes the present invention different from the conventional assembly method. As illustrated in FIG. 1, the conventional method for assembling a motor set involves applying the stator 110 to the motor set assembly 100 and then the rotor 120 to the stator 110 coupled to the motor set assembly 100, increasing chances of causing damages on the magnets of the rotor 120 or potential accidents of the worker whose hands accidently get stuck between the rotor and the stator. The present invention, on the other hand, allows the rotor housing 10 to be applied to the stator 110 not coupled to the motor set assembly 100, providing a space conveniently large enough for the rotor housing 10. This may prevent such problems concerning damages on the magnets or potential accidents of the worker.

In step (b), both the rotor housing 10 and stator 110 coupled to each other are applied to the motor set assembly 100. Here, stator assembly holes 105 of the motor set assembly 100 are aligned with the holes 112 of the shaft bushings 110.

In step (c), the rivets 115 are inserted in the holes 112 through the operating holes 15 of the rotor housing 10 and coupled to the stator assembly holes 105. With the rivets 115 in the holes 112, the stator 110 can be coupled tightly to the motor set assembly 100. Rotor fixing bolt 16 is then applied to complete the assembly of the motor set, in step (d). If necessary, step (d) may precede step (c).

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A method for assembling a motor set comprising:
   (a) aligning a rotor housing having a plurality of operating holes to a stator having coupling bushings with holes formed therein through the operating holes, thereby making the holes to be seen through the operating holes;
   (b) after the step (a), aligning the holes of the coupling bushings associated with the rotor housing to stator assembly holes of a motor set assembly, the holes of the coupling bushings being aligned with the stator assembly holes of the motor set assembly; and
   (c) after the step (b), inserting rivets into the holes through the operating holes of the rotor housing and coupling the rivets to the stator assembly holes so that the stator is coupled to the motor set assembly by the rivets.

2. The method for assembling a motor set as claimed in claim 1,
   further comprising:
   coupling a shaft coupling portion disposed in center of the rotor housing to a shaft of the motor set assembly.

* * * * *